US011860859B2

(12) United States Patent
Aston et al.

(10) Patent No.: US 11,860,859 B2
(45) Date of Patent: Jan. 2, 2024

(54) VIEWING STRUCTURED DATA PUBLISHED TO A TOPIC TREE AS RESTRUCTURED DATA TREE ACCORDING TO A TOPIC VIEW MAPPING

(71) Applicant: DiffusionData Limited, London (GB)

(72) Inventors: Philip Allan George Aston, Maidenhead (GB); Patrick Joseph Walsh, Maidenhead (GB)

(73) Assignee: DiffusionData Limited, London (GB)

( * ) Notice: Subject to any disclaimer, the term of this patent is extended or adjusted under 35 U.S.C. 154(b) by 263 days.

(21) Appl. No.: 17/213,840

(22) Filed: Mar. 26, 2021

(65) Prior Publication Data

US 2021/0303554 A1   Sep. 30, 2021

Related U.S. Application Data

(60) Provisional application No. 63/000,270, filed on Mar. 26, 2020.

(51) Int. Cl.
| | | |
|---|---|---|
| G06F 16/23 | (2019.01) | |
| G06F 16/22 | (2019.01) | |
| G06F 16/901 | (2019.01) | |

(52) U.S. Cl.
CPC ...... G06F 16/2379 (2019.01); G06F 16/2246 (2019.01)

(58) Field of Classification Search
CPC .............. G06F 16/2379; G06F 16/2246; G06F 16/9027
See application file for complete search history.

(56) References Cited

U.S. PATENT DOCUMENTS

| | | | | |
|---|---|---|---|---|
| 10,382,307 | B1 * | 8/2019 | Jindal | H04L 43/0876 |
| 2006/0253441 | A1 * | 11/2006 | Nelson | G06F 16/38 |
| 2007/0088711 | A1 * | 4/2007 | Craggs | G06Q 10/10 |
| 2008/0104258 | A1 * | 5/2008 | O'Neill | H04L 67/62 |
| | | | | 709/228 |
| 2012/0233268 | A1 * | 9/2012 | Bedi | H04L 51/214 |
| | | | | 709/206 |
| 2013/0179502 | A1 * | 7/2013 | Faller | G06Q 50/01 |
| | | | | 709/204 |
| 2015/0286711 | A1 * | 10/2015 | Chin | G06F 16/954 |
| | | | | 707/738 |
| 2016/0105385 | A1 * | 4/2016 | Allen | H04L 51/214 |
| | | | | 709/206 |

* cited by examiner

*Primary Examiner* — Robert W Beausoliel, Jr.
*Assistant Examiner* — Mohammad S Bhuyan
(74) *Attorney, Agent, or Firm* — Fenwick & West LLP (57) ABSTRACT

A distribution server restructures content and information published to a topic tree for more efficient and meaningful presentation to a subscribing client. To do so, the distribution server receives a request to create a topic view from a client and creates the topic view in response. The topic view includes a set of selected topics and a topic view mapping. The topic view mapping maps the topic paths for the set of selected topics to a set of reference topics at a set of reference paths. In other words, the topic view restructures the content and information by creating new branches in the topic tree. Whenever a selected topic receives an update from a publisher, the distribution server publishes the update as restructured content and information to the reference topics at the reference paths. A client subscribed to the reference path receives the update in a restructured manner.

21 Claims, 5 Drawing Sheets

VIEWING STRUCTURED DATA PUBLISHED TO A TOPIC TREE AS RESTRUCTURED DATA TREE ACCORDING TO A TOPIC VIEW MAPPING

CROSS REFERENCE TO RELATED APPLICATIONS

This application claims the benefit of U.S. Provisional Patent Application No. 63/000,270 filed on Mar. 26, 2020, the contents of which are incorporated by reference in their entirety.

FIELD OF ART

This disclosure generally relates to the field of data distribution, and more specifically, to presenting structured content and information from a topic tree as restructured content and information according to a topic mapping.

BACKGROUND

The increased demand for data means that business systems and applications must exchange data efficiently and intelligently at scale with devices, browsers, and other applications over the Internet. To meet this increased demand for data, some data distribution platforms employ a publish-subscribe model in which senders of messages, called publishers, publish messages into classes (e.g., topics) without knowledge of subscribers who may receive the messages. Subscribers in a topic-based publish-subscribe system will receive all messages published to the topics to which they subscribe.

In some cases, messages published to topics can have a complex structure and relate a vast amount of data that changes rapidly. When this occurs, subscribers subscribed to the topics may receive more complex data than they or interested in, or the data may be relayed inefficiently. Thus, a method for restructuring complex data structures such that it can be more efficiently published to subscribers would be beneficial.

SUMMARY

A distribution server restructures content published to a topic tree according to a topic view. The topic tree includes a plurality of topics, and each topic of the plurality of topics corresponds to a topic path of a plurality of topic paths in the topic tree. That is, each topic in the topic tree is located at a topic path. Clients can subscribe to topics at topic paths, and publishers can publish topic updates to topics at topic paths.

The distribution server receives a topic view creation request from a client (e.g., an administrator client). The topic view creation request specifies a requested mapping of a set of selected topics of the topic tree to a set of reference topics in the topic tree. The mapping is defined according to the syntax of the topic view creation request.

Responsive to receiving the topic view creation request, the distribution server creates the set of reference paths in the topic tree based on the syntax of the topic view creation request. Each reference topic is created at a corresponding reference topic path in the topic tree. Reference topic paths are included in the plurality of topic paths in the topic tree.

The distribution server receives a topic update from a publisher of a plurality of publishers. The topic update defines topic values for at least one of the set of selected topics defined by the topic view.

Responsive to receiving the topic update, the distribution server restructures the topic values by mapping them from at least one selected topic to the set of reference topics. The distribution server publishes the restructured topic values from the topic update to a client subscribed to a reference topic of the set of reference topics.

The syntax of the topic view creation request defines how data is restructured. In an embodiment, syntax of the topic view creation request defines a set of topic selectors for the set of selected topics. The set of topic selectors describe a set of selected topic paths of the plurality of topic paths corresponding to their respective selected topics. In an embodiment, the syntax of the topic view creation request defines a topic view mapping that maps a set of selected topic paths corresponding to their respective selected topics to a set of reference topic paths corresponding to their respective reference topics. Moreover, in an embodiment, the syntax of the topic view creation request defines a set of options that dictate how the distribution server publishes restructured topic values to the client.

The syntax of the topic view creation request can also define specific mapping directives. In an embodiment, the syntax of the view creation request defines an expansion directive. The expansion direction maps a first number of elements in a topic value of a selected topic of the set of selected topics to the first number of reference topics in the set of reference topics. In an embodiment, the syntax of the view creation request defines an insert directive. The insert directive maps a topic value not included in the set of selected topics to a respective reference topic in the set of reference topics.

The distribution server can manage many topic values. In that regard the distribution system can receive a plurality of topic view creation requests to create a plurality of topic views. Each topic view creation request may have similar structure. That is, each topic view creation request defines a mapping from a set of selected topics of a plurality of sets of selected topics to a set of reference topics of a plurality of sets of reference topics. Each mapping is defined according to a syntax of a plurality of syntaxes included in the topic view creation request. Each topic view creates the plurality of sets of reference topics in the topic tree based on the plurality of syntaxes in the plurality of topic view creation requests.

The figures depict embodiments for purposes of illustration only. One skilled in the art will readily recognize from the following description that alternative embodiments of the structures and methods illustrated herein may be employed without departing from the principles of the invention described herein.

DETAILED DESCRIPTION

I. Introduction

In one embodiment, a method to more efficiently communicate content and information to clients in a publish-subscribe system is described. The publish-subscribe system includes a topic tree which is organized in a topic hierarchy. The topic tree is comprised of a plurality of topics to which clients can subscribe to and publisher can publish to. Publishers publish topic updates to the topics and clients subscribed to those topics receive the updates. Publishers can publish to various numbers of topics, including a single, dozens, hundreds, or even thousands of topics. Clients can subscribe to similar numbers of topics.

Additionally, publishers can publish topic updates to topics very rapidly (e.g., on the order of milliseconds). Interpreting the structured data at high speeds within the topic tree can be very challenging for users because the structural hierarchy of topics may be very complex, publishers publish to large numbers of topics, and clients subscribe to large numbers of topics.

To illustrate, consider an example where a publish-subscribe system includes a set of hierarchically structured topics relating the current exchange rates between every currency in the world. The publish-subscribe system, for example, includes a topic describing the exchange rate of the United States Dollar (USD) against every other world currency, a topic listing the exchange rate of the British Pound Sterling against every other world currency, etc. To receive updated information regarding the exchange rates for the USD, the client may subscribe to the appropriate topic. In doing so, the client would receive real-time information regarding the exchange rate of the USD against over 150 other currencies. If the client only cares about a handful of those currencies, relating such a large amount of irrelevant data to the client is computationally inefficient. For example, publishing conversion updates several times per second for hundreds of currencies would require more bandwidth and processing power than necessary for the handful of currencies the client cares about.

The publish-subscribe system described herein allows a user to create a topic view that restructures complex structured content and information such that it is more efficiently transmitted to a client. That is, considering the previous example, a client may be able to create a topic view that restructures the USD conversion information to present only the handful of currencies the client cares about. In doing so, the publish-subscribe system can more efficiently convey pertinent information (e.g., requiring less bandwidth).

II. Data Distribution Environment

Figure 1:
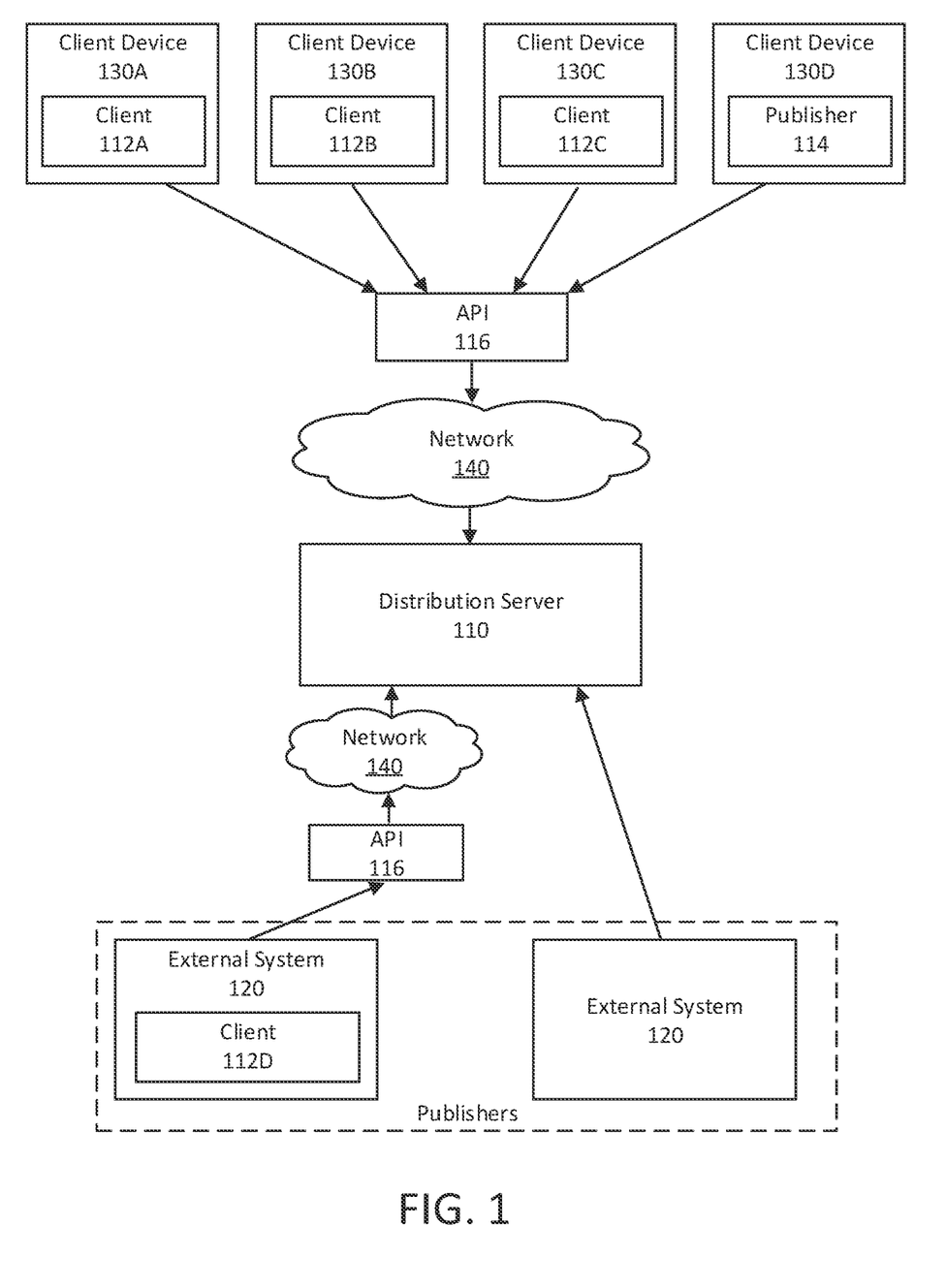
FIG. 1 is a block diagram of a distribution server, according to one example embodiment.

FIG. 1 is a block diagram of a distribution server environment, according to one example embodiment. The distribution server environment ("environment") 100 includes a data distribution system server 110, external systems 120, client devices 130, and a network 140.

The data distribution system server ("distribution server") 110 hosts a topic tree, manages connections and sessions from clients 112 and external systems 120, and pushes data to the clients 112 through message queues. That is, the distribution server 110 pushes (streams) and receives data and events, in real-time, both to and from clients 112. Within this framework, the distribution server also maintains topic views that enable clients 112 to view structured information from the topic tree in a restructured manner. The distribution server 110 is described in greater detail in regard to FIG. 2.

One or more external systems 120 interact with the distribution server 110 to distribute data to multiple client applications over a network 140. An external system 120 may be a server associated with a data source for distribution via the distribution server 110. Example data sources include entities such as a stock exchange, an online game provider, a media outlet, or other sources that distribute topical data to users over the network 140, such as the Internet.

The external system 120 communicates with the distribution server 110, which enables the external system 120 to create and maintain topics on the distribution server 110 for distribution to multiple clients 112. Alternatively, topics may be maintained by a separate client process external to the distribution server 110. Such clients 112 are referred to as control clients and sometimes they are maintained by an external system 120 (e.g., client 112D). Systems and clients that maintain topics on the distribution server 110 are "publishers" (e.g., client device 130D includes a publisher 114). In various configurations of the environment 100, publishers 114 may directly connect to the distribution server 110, may connect to the distribution server 110 via the network 140, or both.

Client devices 130 communicate with the distribution server 110 through a network 140. The client devices include also a client 112. A client 112 can be an application that communicates with the distribution server 110 using one or more specified client protocols. Example client protocols include WebSocket (WS) and Hypertext Transfer Protocol (HTTP). Some clients 112 connect to the distribution server 110 to subscribe to topics and receive message data on those topics. Other clients 112, which have different permissions, perform control actions such as creating and updating topics or handling events. In an embodiment, one permission grants a client 112 administrator status. Administrators are allowed to create and manage topic views within the distribution system. That is, an administrator client 112 has permissions to create and send a topic view creation request to the distribution server, such that the distribution server module implements the requested topic view.

The clients 112 can include web clients 112A, mobile clients 112B, and enterprise clients 112C. Web clients 112A include browser applications that use JavaScript. Enterprise clients 112B may be any application connecting to the distribution server 110 over a distribution server protocol for Transmission Control Protocol (TCP) over the network 140 using Java, .Net, Python, or C APIs. Mobile clients 112C may be mobile applications that interact with the distribution server 110 using iOS or Android APIs.

Generally, clients 112 interact with the distribution server 110 using an API 116. The API 116 may include the libraries appropriate to the platform executing the client application. The category of client 112 depends on the language of the API and libraries used to implement it. Clients 112 may be implemented in one of a number of languages and use variety of protocols to communicate with the distribution server 110. Clients may perform different types of actions depending on their permissions and the capabilities of the API they use. Example APIs include JavaScript API, Java API, .NET API, C API, iOS API, Android API, and Python API.

Clients 112 used by data consumers typically subscribe to topics and receive from the distribution server 110 the updates that are published to these topics. Clients 112 used by data providers typically create, manage, and update topics. These clients 112 also take responsibility for control functions, for example authenticating and managing other client sessions.

III. Distribution Server

Figure 2:
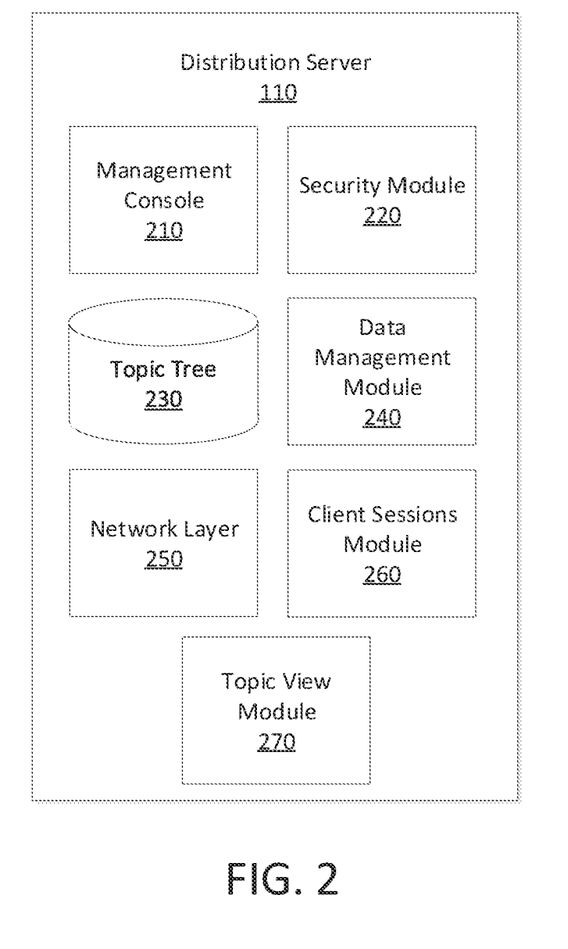
FIG. 2 is a block diagram illustrating components of a distribution server, according to one example embodiment.

The distribution server 110 manages topic views for presenting restructured content and information ("restructured data") to clients 112. To expand, the distribution server 110 receives structured content and information ("structured data"), in real-time, from both clients 112 and external systems 120. The distribution server 110 continuously pushes (i.e., streams) the structured data to clients 112 via the network 140. In some cases, the distribution server 110 pushes the structured data to client devices as restructured data according a topic view, as described below. To enable this functionality, the distribution server 110 includes a management console 210, a security module 220, a topic tree 230, a data management module 240, a network layer 250, a client sessions module 260, and a topic view module 270.

The network layer 250 handles a high number of concurrent connections without the need for a separate thread per connection. For example, the network layer 250 may be able to handle hundred, thousands, hundreds of thousands, etc. simultaneous connections from clients 112. Further, connectors handle connections from many different types of clients 112 and for various protocols. Connectors may be configured to listen on different ports and multiple clients 112 may connect to a single port. With this approach, tens of thousands of concurrent connections can be serviced by a small pool of threads.

The security module 220 authenticates all connections from clients 112, publishers 114, and external systems 120. The security module 220 also manages authorizations and permissions for those systems. The authorizations and permissions enable the systems to take various actions associated with their authorizations and permissions when they are connected to the distribution server 110.

The client sessions module 260 manages the sessions for the clients 112 that connect to the distribution server 110. A session, in an example, is an interactive information interchange having a session state that can persist over multiple connections. Additionally, the client sessions module 260 stores information about each client 112 and their session(s). The information may include subscription information such as which topic a client 112 is subscribed to, topic selectors received from the client 112, etc. If a client 112 disconnects, it can reconnect to the same session within a specified time period using the information stored in the client sessions module 260.

The data management module 240 performs operations on structured and restructured data to more efficiently deliver it to clients 112. Example operations include structural conflation, merging, and replacing data to ensure that the latest data is received by the client 112. Additional data operations can include creating binary and structural deltas to more efficiently stream structured and restructured data to clients.

The management console 210 can manage (i.e., create, manipulate and publish data to) topic views within a topic tree. The management console 210 can also create topics and send data to those topics as a test environment.

Within the environment 100, publishers 114 publish data to a topic tree 230. More generally, publishers 114 are systems (e.g., an appropriately configured client device 130 or external system 120) within the environment 100 that manage the data for one or more topics and publish messages to any clients 112 that subscribe to the topics that the publisher manages. In one example, publishers 114 are written using the client API functionality.

A publisher 114 creates, owns, and manages topics within a topic tree. A publisher 114 is a client 112 configured with publishing permissions. The publisher 114 initializes data in its topics as and updates it as a result of external events. For example, a publisher 114 can initialize a data item representing the betting odds of a sporting event and publish updates to the betting odds based on external information regarding the participating teams. When a client 112 first subscribes to a topic the distribution server 110 provides the client 112 with a snapshot of the current state of the data relating to that topic. This is referred to as a "current value." For example, if a client 112 subscribes to the aforementioned sporting event, the distribution server 110 would provide a current value to the client 112 reflecting the current state of the odds. As time progresses, a client 112 can also request the current state of a topic, even if not subscribed to it, using the "fetch" command. For example, a client 112 not subscribed to the sporting event could still fetch the odds for the sporting event from the publisher 114.

The distribution server 110 maintains any changes to topic data states and publishes those changes to the topic as delta messages when a publisher 114 publishes a change to the topic. This results in a topic value being sent to every client 112 that is subscribed to the topic. For example, if a publisher 114 changes the odds of the sporting event, the distribution server 110 publishes the change in odds to the subscribing clients 112. The distribution server 110 can send messages to individual clients 112, or to groups of clients 112, and can receive messages from clients 112. In most configurations, the publisher 114 does not need to know or keep track of the clients 112 subscribed to its topics, rather the distribution server 110 maintains the subscription information. In this manner, a publisher 114 may publish updates to the distribution server 110, which then publishes the updates to the subscribing clients 112. Further, publishers 114 manage (see below) the topics they create.

The topic tree 230 is a model representing the organizational structure of topics within the distribution server 110. Publishers 114 can publish structured data to the topic tree 230 and clients can subscribe to, and receive information and data regarding, topics in the topic tree. The topic tree 230 may be maintained by the publisher 114, client sessions module 260, other software within the distribution server 110, or another appropriately configured system within the environment. In a more distinct example, the topic tree 230 is maintained by clients with sufficient permissions to create and update topics within it (i.e., a publisher 114).

The topic tree 230 is structured hierarchically. That is, in an example, the topic tree 230 comprises top-level topics, each of which may include subordinate topics underneath those top-level topics. Subordinate topics themselves can have subordinate topics. A topic of any type can be bound to any node of the topic tree. For example, a top-level topic may be bound to a node and each of its subordinate topics bound to their own nodes.

Figure 3:
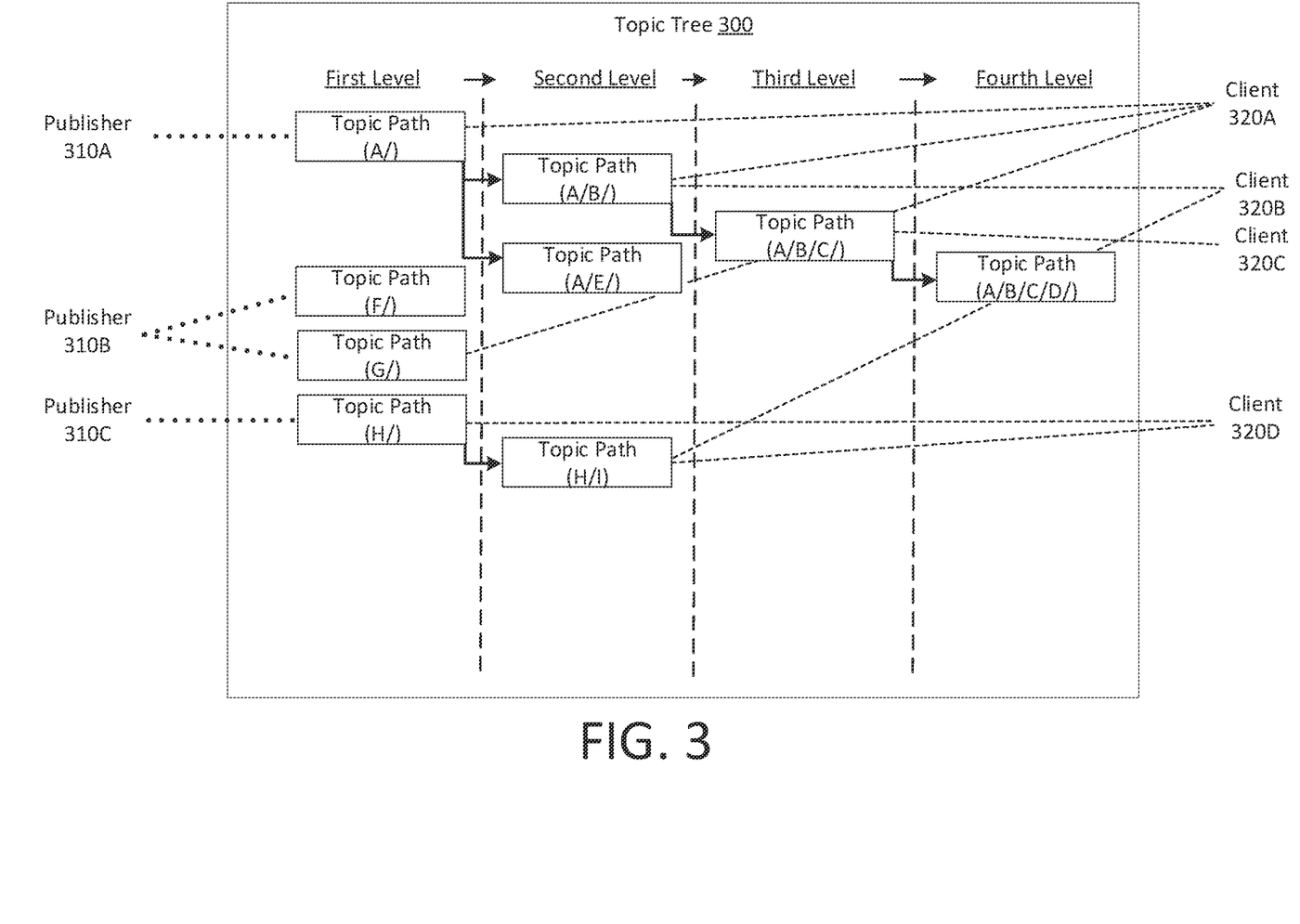
FIG. 3 is a diagram illustrating a topic tree, and logical connections between publishers and clients based on topics, according to one example embodiment.

FIG. 3 is a diagram illustrating a topic tree, and the logical connections between publishers and clients based on topics, according to one example embodiment. The topic tree 300 is an example representation of the topic tree 230 in FIG. 2. Additionally, the publishers 310 and clients 320 are example representations of the clients 112 and publishers 114, respectively, in FIG. 1

Topics in the topic tree 300 are created in the distribution server 110 by publishers 310. A publisher 310 is a client with the appropriate publishing permissions. Here, the topics are structured hierarchically within the topic tree 300 according to the structure maintained by the distribution server 110.

A topic in the topic tree 300 is described by its topic path. A topic path is a description of the location of the topic within the topic tree 300. In an example, the topic path describes the location of the topic within the hierarchy of the topic tree using slash characters ( ).

Using the illustrated example, the topic tree includes the following topic paths describing their topics: (A), (A/B), (A/B/C), (A/B/C/D), (A/E), (F), (G), (H), and (WI). Topics at topic paths (A), (F), (G), and (H) are at the first level (i.e., highest level) of the tree structure. Topics at topic path (A/B) and (A/E) are subordinate to (A). Because (A/B) and (A/E) are subordinate to a first level topic, they are in the second level of the topic tree 300. Additionally, the topics at topic path (H/I) is subordinate to the topic at topic path (H) in the second level of the topic tree 300. Topic at topic path (A/C) is subordinate to the topic at topic path (A/B) and, due to its subordination, in the third level of the topic tree. The topic at topic path (A/B/C/D) is subordinate to the topic at topic path (A/B/C) and, due to its subordination, is in the fourth level of the topic tree. A topic path may also be used by a client 320 to send messages to the publisher 310 that receives messages on that topic path. The client 320 is not aware of the publisher, only of the topic path.

Each topic corresponds to a node in the topic tree 300. Generally, the node contains a corresponding topic value, but may not if no topic values have been published to the node. A topic is a data object describing a current value (i.e., topic value) of the topic. In other words, a publisher 310 publishes topic values to a node at its corresponding topic path, and clients 320 receive the topic values located in the nodes. Topic values can be various formats and represent many different types of information. For example, topic values may be a JSON object and therefore may contain maps and/or arrays of data values. In another example, topic values may be a binary data object, or a binary representation of different data object. Other data formats are also possible.

The example also illustrates how publishers 310 and clients 320 interact with the topic tree 300. In the illustrated example, clients 320 and publishers 310 are loosely coupled through logical links representing the topics. As shown, a publisher 310 publishes topic values to a topic located at a topic path and a client 320 subscribes to a topic and receives its topic values.

Here, publisher 310A is configured with permissions to manage (i.e., publish topic values to) the topic at topic path (A) and all of its subordinate topics. The appropriate permission is denoted by a dotted line. As such, publisher 310A can publish information to any of the managed topics. For example, the publisher 310A can publish information to the topic at topic path (A/E), or the topic at topic path (A/B/C). Similarly, publisher 310B manages the topics at topic path (F) and (G) while publisher 310C manages topics at topic path (H) and (H/I) and both can publish information to its owned topics.

Moreover, each of the clients 320 are subscribed to at least one topic in the topic tree 300. Subscriptions are denoted by dashed lines. Client 320A is subscribed to topic paths (A), (A/B), and (G). As such, when a publisher 310 publishes topic values to one of its subscribed topics, client 320A will receive the corresponding topic value updates. Similarly, client 320B is subscribed to topic paths (A/B) and (H/I), client 320C is subscribed to topic paths (A/B/C), and client 320D is subscribed to topic paths (H) and (H/I). Clients 320B, 320C, and 320D also receive topic value updates regarding their subscribed topics when a managing publisher 310 publishes information to the topic.

Returning to the distribution server 110 in FIG. 2, the client sessions module 260 maintains subscription information about the topics each client 112 is subscribed to. For each client 112, the subscription information includes a list of topic selections. A topic selection includes data that identifies a subset of topics of the topic tree 230 and whether the client 112 is subscribed to that subset of topics of the topic tree 230.

A topic selection for a client 112 includes one or more topic selectors. A topic selector is an expression that identifies a subset of topics in the topic tree 230 to which a client 112 wishes to subscribe. Topic selectors generally correspond to one or more topic paths of a topic rather than a topic name for the topic. Each topic selection also includes a subscription operation type value indicating whether the topic selector is subscribing to or unsubscribing from the topic tree.

In one configuration, the topic selector may be a hierarchical wild-card expression that enables multi-faceted selection of topics. To illustrate, referring to the topic tree 300 of FIG. 3, client 320C may have subscribed to the topic at topic path (A/B/C) by transmitting a topic selector expression "A/B/C" corresponding to the topic path to the distribution server 110. Upon receipt, the client sessions module 260 adds the topic selector expression to the topic selection for client 320C. Thereafter, client 320C is subscribed to the topic at topic path (A/B/C). In another example, client 320D may have subscribed to topics at topic paths (H) and (H/I) by transmitting a topic selector expression "H*" to the distribution server 110. The client session module 260 adds the topic selector expression to the topic selection for client 320D. Because the topic selector is a hierarchical wild-card expression, client 320D is subscribed to all topics and sub-topics on path H, i.e., (H) and (H/I). Other wildcard expressions are also possible.

Returning again to FIG. 2, the client sessions module 260 is configured to change topic selections for a client using subscribe and unsubscribe operations. Each operation adds a new topic selector to the client's topic selections. When a new topic is added by the publisher 114, the topic's path is evaluated against every client session's unique topic selections. To reduce the cost of evaluation, topic selections for a client are conflated to remove redundant selectors.

The topic view module 270 manages topic views within the distribution server 110. A topic view presents structured data from the topic tree 230 as restructured data. In an example, restructured data is a subset of the structured data from the topic tree 230 placed in a different area of the topic tree 230 that allows for any of (1) publishing the subset of the structured data to a client 112 more efficiently than the totality of the structured data, (2) publishing the subset of structured data in a manner according to publication or presentation preferences of a client 112, and/or (3) publishing the subset of structured data in a more granular fashion. Technical details of topic views are described in greater detail below in the section titled "Topic Views Overview" but many of their principles are introduced here.

To introduce topics views, using a simple example, a topic view takes topic values from structured nodes in the topic tree 230 and presents the topic values in a restructured manner at different nodes in the topic tree 230. Here, as described in greater detail below, the restructured data more efficiently publishes a small subset of topic values in the topic tree 230 according to administrator preferences prescribed by the syntax of the topic view creation request. That is, for example, an administrator creates a topic view the restructures data in a manner that more efficiently publishes subsets of information to clients 112.

In another illustration, consider a distribution server 110 that publishes structured data regarding a set of topics in the topic tree 230 to a client 112. An administrator of the distribution system 100 determines that distributing the entirety of the information for the set of topics is too computationally and bandwidth expensive. The administrator employs a client 112 to create a topic view defining how to present a subset of the topics as restructured data in a more efficient manner. Now, rather than inefficiently receiving information regarding all of the topics, clients 112 more efficiently receive information regarding only the subset of topics.

Returning to an in-depth explanation, the topic view module 270 maintains topic views as a persistent data object that is defined in terms of a domain specific language (i.e., a specific syntax). The domain specific language is configured to allow clients 112 to create topic views. The syntax of the data object defines how to restructure the structured data for more efficient publication. Within its syntax, a topic view includes three portions that define how to restructure data: a set of topic selectors for the topic view, a topic view mapping ("mapping"), and a set of topic view options ("options"). Topic view selectors, mappings, and options all may have syntax indicating their prescribed functionality within a created topic view.

Now defining each syntax section of the topic view in turn, the set of topic selectors select a set of topics ("selected topics") from the topic tree 230 that the client 112 wishes to include in the topic view. That is, each topic selector included in the topic view corresponds to one of the selected topics. The selected topics are a subset of the topics in the topic tree 230 that, when included in the topic view, allow for a more efficient publication of structured data as restructured data.

The mapping maps the set of selected topics to reference topics. More specifically, the mapping maps the topic path of a selected topic to a reference path of a reference topic. A reference topic is a new topic in the topic tree 230 that maintains restructured data. A reference path is the location of the reference topic in the topic tree 230 that a client may subscribe to. Reference paths are functionally similar to topic paths within the topic tree 230 and distribution server 110. In some cases, a reference topic at a reference path may be similar to selected topics at their topic paths, but just in a different location of the topic tree. Further, reference topic paths can be generated from a mixture of constants, parts of the selected topic's topic path, or field values within the selected topic value based on the syntax of the mapping, as described in greater detail below.

To provide a brief example, a user (e.g., a system administrator) can define a mapping that maps selected topics at one or more nodes in a topic tree 230 to one or more reference topics at one or more new nodes in the topic tree 230. In other words, the mapping redefines the structure of the topic tree 230 by creating new branches within the topic tree 230 that can more efficiently publish information to clients than the original structure.

The set of topic view options defines options for the topic view. The options are maintained by the distribution server and allow an administrator to tailor how a topic view restructures information (i.e., how restructured topic view updates are published). Some options include inserting topic values into the topic view from other topics in the topic tree, or expanding topics having expandable data structures as a topic value to multiple reference topics. Additional options can include throttling published topic values, delaying published topic values, or changing the specification of the topic in some manner. Other examples also exist. Generally, options defined for a topic view apply to all reference topics created by the topic view, but higher levels of granularity is also possible.

Once received from a client 112, the topic view module 270 utilizes the syntax of the topic view to create reference topics at reference paths in the topic tree 230. This process is described in greater detail below, but, generally, the topic view module 270 maps selected topics to reference topics according to the mapping and options in the topic view.

Reference topics and reference paths (i.e., those created by a topic view) share many similarities to topics and topic paths in the topic tree 230. For example, clients 112 can subscribe and unsubscribe to the reference topic at the reference path. Additionally, content and information is published to the reference topics such that subscribed clients 112 can receive (or fetch) that information (which is restructured according to the mapping).

However, how content and information is published to a reference topic at a reference path differs substantially from that of a topic at a topic path. As described above, publishers 114 manage topics in a topic tree 230. As such, they can publish structured data to topics in the topic tree 230 and the distribution server 110 distributes the published information to clients 112 subscribed to those topics. Here, however, the distribution server 110 employs the topic view module 270 to restructure and publish topic updates to reference topics according a topic view. To do so, the topic view module 270 evaluates a topic view each time a publisher publishes structured data to a selected topic referenced by the topic view. More explicitly, if a publisher 114 publishes a topic update to a selected topic from the topic view, the distribution server 110 restructures the topic update according to the topic view (i.e., evaluates the topic view) and publishes it to the reference topics as restructured data.

To improve transmission and processing efficiency, the topic view module 270 only evaluates a topic view when selected topics for that topic view receive an updated topic value. To accomplish this, when a topic view is received by the data distribution server 110 the topic view module 270 "tags" all selected topics in the topic view. Tagging a topic indicates that its corresponding topic view will be evaluated when the tagged topic receives a topic update. Thus, when a publisher 114 publishes a topic to a tagged topic in the topic tree 230, the topic view module 270 evaluates the topic view (i.e., restructures data according to the topic view) and publishes the restructured data to a reference topic in the topic tree 230. Any clients 112 subscribed to the reference topic will receive the restructured data.

The topic view module 270 can evaluate a topic view to restructure data in several ways. In a simple example, discussed briefly above, when a publisher 114 publishes a topic update to a topic, the topic view module 270 compares the previous topic value to the new topic value to determine whether to update a reference topic. If the topic view module 270 determines there is a difference between the previous topic and the new topic, it restructures the topic update according to the topic view and publishes the restructured data to the reference topic.

In a more complex example, evaluating a topic view can further restructure the data. That is, when a publisher 114 publishes a topic update to a topic, the topic view module 270 may create additional reference topics, delete reference topics, or change the structure of a reference topic (i.e., change the reference topic path). For instance, consider a topic view that maps a topic with an n field array topic value to a corresponding n reference topics. If a publisher 114 publishes a topic update to the topic with an n+1 field array topic value, the topic view module 270 compares the new topic value (e.g., n+1 field array) to the previous topic value (e.g., n field array). Because there is a difference between topic values, the topic view module 270 will evaluate the topic view. In this instance, because the mapping maps each element of the array to a corresponding reference topic, the topic view module 270 evaluates the topic view and creates a new reference topic such that there are n+1 reference topics. The topic view module 270 may also publish any topic updates to the reference topics as restructured data according to the topic view. Similar functions occur for deleting topics and deleting topic views. These more complex cases are described in greater detail below.

Figure 4:
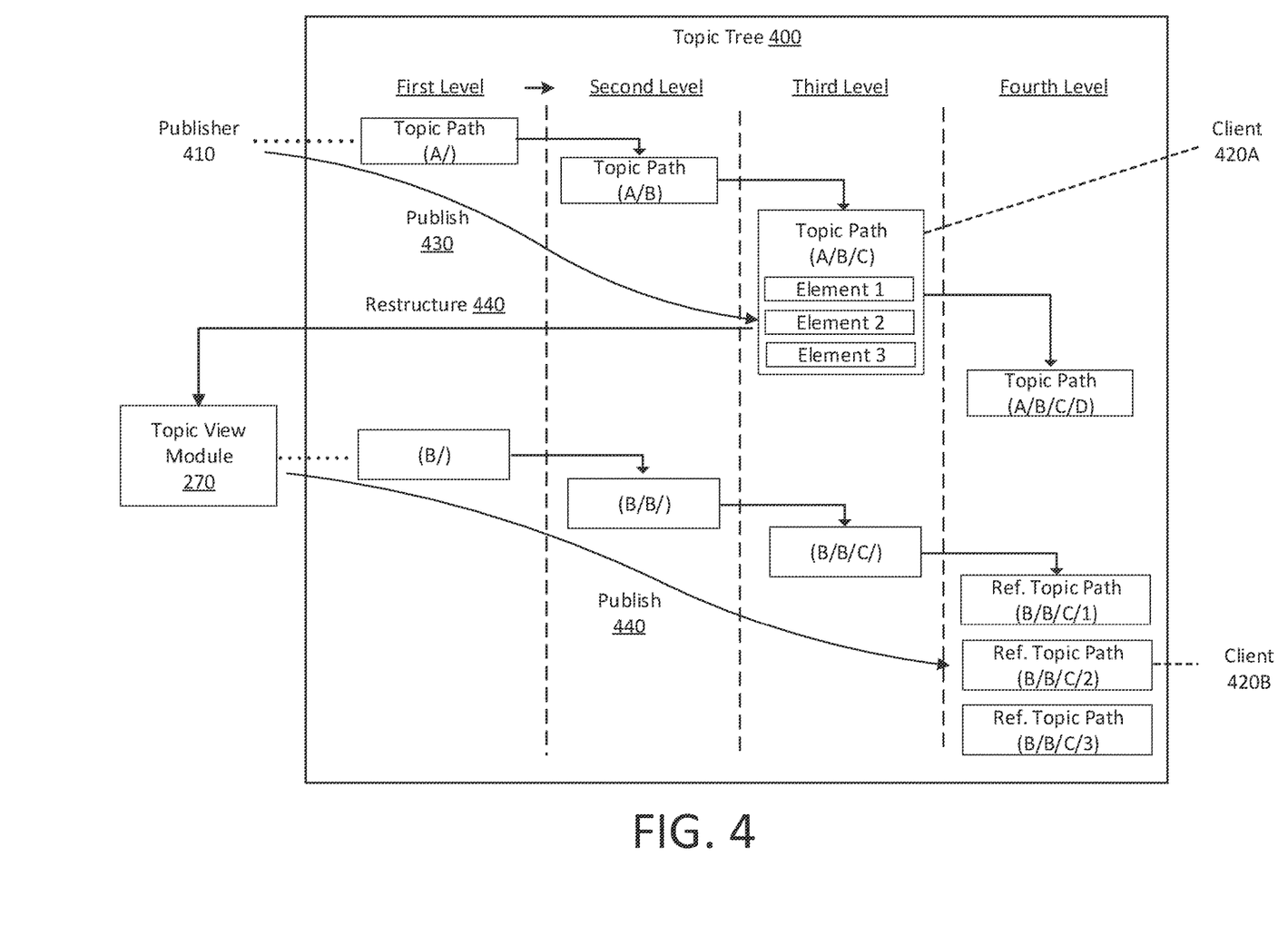
FIG. 4 is a diagram illustrating a topic tree including a topic view and logical connections between publishers, clients, and the topic view module, according to one example embodiment

FIG. 4 is a diagram illustrating a topic tree including a topic view, and logical connections between publishers, clients, and the topic view module, according to one example embodiment. The topic tree 400 is substantially similar to the topic tree 300 in FIG. 3. That is, the topic tree 400 includes an array of topics, each having a topic at a topic path. Further, publishers 410 can publish structured data to the topics in the topic tree 400, and clients 420 can subscribe to the topics such that they can receive the structured data.

However, the topic tree 400 of FIG. 4 is different from the topic tree 300 of FIG. 3 because it includes reference topics at reference paths created and managed by the topic view module 270. Each reference path describes the location of the reference topic in the structural hierarchy of the topic tree 400 maintained by the distribution server 110. As described herein, each reference topic path reflects a mapping from an original topic (e.g., a selected topic) to a reference topic included in a topic view maintained by the topic view module 270.

The example also illustrates how publishers 410 and clients 420 interact with the topic tree 400, and how the topic view module 270 manages topic views based on those interactions. In the illustrated example, a publisher 410 manages topics at topic path (A) and all of its sub-topics. A client 420A subscribes to a topic at (A/B/C), which is a sub-topic of the topic at topic path (A). The topic path at topic path (A/B/C) includes a topic value that includes 3 different elements: Element 1, Element 2, and Element 3.

In order to more efficiently transmit the information in the topic at topic path (A/B/C) to other clients (i.e., rather than all of the elements), an administrator creates and submits a topic view to the topic view module 270.

Once received, the topic view module 270 creates reference topics based on the topic view. Here, the topic view maps the elements of the topic at topic path (A/B/C) to individual reference topics at distinct reference paths. Accordingly, the topic view module 270 creates reference topic 1 at reference path (B/B/C/1), reference topic 2 at reference path (B/B/C/2), and reference topic 3 at reference path (B/B/C/3), and each reference topic corresponds to an element of the topic at topic path (A/B/C). The reference topics at the reference topics paths are in the fourth level of the structural hierarchy because they are subordinate to three other topics in the topic tree 400. As such, there are nodes in the topic tree 400 at the first, second, and third levels of the topic tree, but those nodes do not contain a reference topic value. Nodes at in the topic tree that have a topic path but do not include a topic having a topic value are also possible for the topic tree 300 in FIG. 3, although they are not illustrated.

Because the topic at reference path (A/B/C) is included in a topic view, the topic view module 270 tags that topic. As such, whenever the publisher changes the topic value of the topic at topic path (A/B/C), the topic view module 270 will evaluate the topic view (i.e., restructure the data according to the topic view). In this case, any change in the topic value at the topic at topic path (A/B/C) will cause the topic view module 270 to restructure the new data according to the topic view, as needed, and publish the restructured data to Reference Topic 1, Reference Topic 2, and Reference Topic 3, if necessary. Further, the topic view module may add or remove reference topics if the number of elements in the topic at topic path (A/B/B) changes.

Furthermore, as described above, the topic view module 270 manages the reference topics within the topic tree 400 of FIG. 4. As such, the topic view module 270, rather than a publisher 410, will publish topic updates to a reference topic. The published topic values are restructured according to the topic view maintained by the topic view module 270.

To illustrate, consider a publisher that publishes 430 a topic update to the topic at topic path (A/B/C). The topic update changes element 2, and element 3. Because the topic at topic path (A/B/C) is tagged as being included in a topic view, the topic view module 270 evaluates 440 any topic view including the topic at topic path (A/B/C). Here, evaluating the topic view causes the topic view module 270 to determine if there is a difference between the previous topic value of the topic at topic path (A/B/C) and the current topic value of the topic at topic path (A/B/C). Because there is a difference, the topic view modules restructures 440 the topic update according to the topic view and publishes 450 the restructured topic updates to Reference Topic 2 and Reference Topic 3.

Additionally, because the client 420B is subscribed to Reference Topic 2, it will see the change to the topic value created by the publisher 410, but according to the restructuring of the topic view. Notably, client 420A will see all of the changes to the topic at topic path (A/B/C) (without restructuring), while client 420B will more efficiently see only the changes to Element 2 of the topic at topic path (A/B/C).

The topic view module 270 can also manage many topic views. That is, the topic view module 270 can manage topic views each having their own topic selectors, topic view mapping, and options. In this case, whenever any of the topics selected by the topic views are updated by a publisher 410, the distribution server 110 evaluates all of the pertinent topic views. Additionally, topic views can reference other topic views. Thus, if the reference topics created by a first topic view are selected by a second topic view, the second topic view will be updated when the first topic view changes, which updates when one of its selected topics updates, etc. Finally, the topic view module 270 can publish restructured information as a delta stream. That is, determining a delta between a previously published restructured data and the most recent published restructured delta and publishing solely that delta. Clients 112 may be configured to interpret the delta such that its displayed delta accurately reflects the recently published restructured data. In other words, delta interpretation occurs within the client such that it is presented with a new topic value, even though only the delta is transmitted through the network 140.

Moreover, the topic view module 270 continuously manages topic views once they are created. That is, once a topic view and its corresponding reference topics at reference topic paths are created, the topic view module 270 dynamically updates topic values for the reference topics, removes reference topics when selected topics change, and adds reference topics when selected topics change. Management occurs in perpetuity until an administrator removes the topic view from the topic tree 230. Thus, an administrator is able to create a topic view that robustly restructures data in a manner that provides it more efficiently (e.g., less bandwidth, less processing power) to clients 112 within the environment 100.

IV. Example Topic View Workflow

Figure 5:
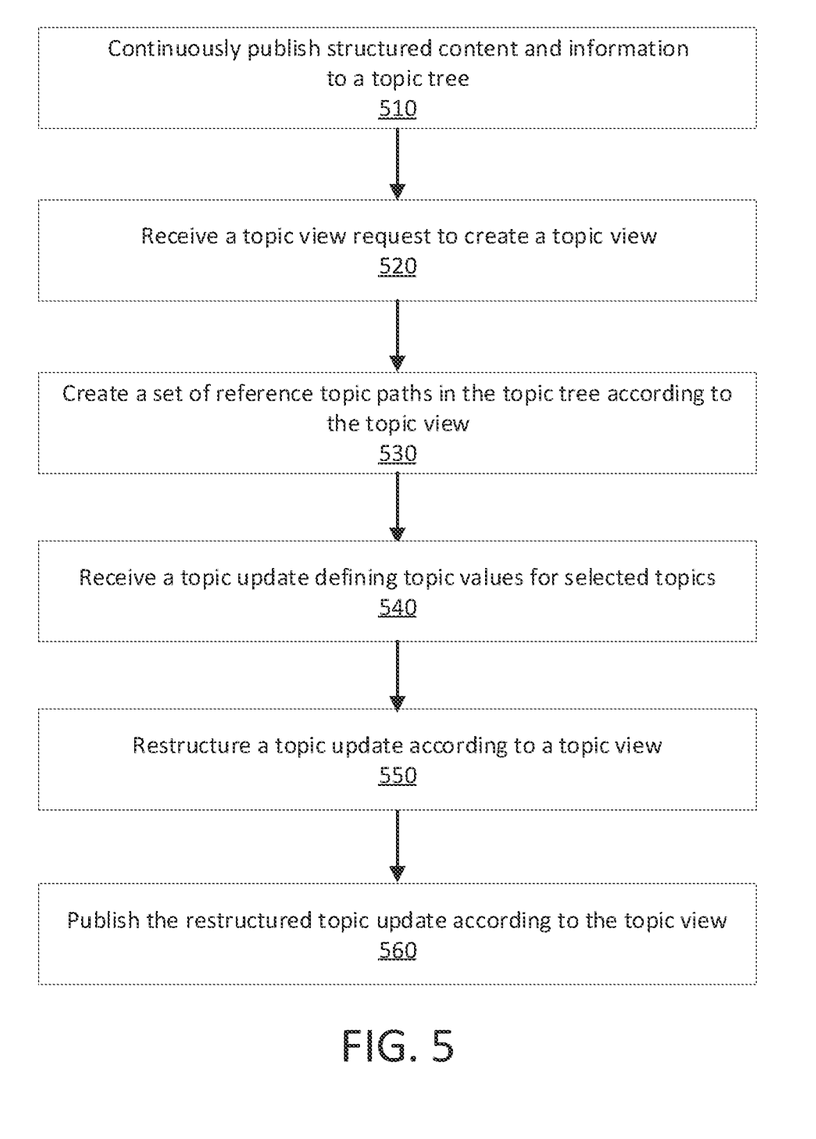
FIG. 5 illustrates a first workflow diagram for operating the distribution server to restructure content and information, according to one example embodiment.

FIG. 5 illustrates a first workflow diagram for operating the distribution server to restructure content and information, according to one example embodiment. The workflow shown in FIG. 5 can be performed by the distribution server 110 within the environment 100 but could be performed by other systems within other environments. Some or all of the steps may be performed by other entities or systems. In addition, the workflow may include different, additional, or fewer steps, and the steps may be performed in different orders.

A distribution server (e.g., distribution server 110) continuously publishes 510 structured data to a topic tree (e.g., topic tree 230) as publishers (e.g., publisher 114) publish topic updates to their managed topics. The topic tree is a hierarchically structured model storing content and information regarding the topics. Each topic corresponds to a topic path describing its location in the topic tree, and each topic corresponds to a node containing a topic value for the topic. Publishers publish structured data by providing updated topic values for their topics to the distribution server, and clients (e.g., client 112) can receive the content and information via the distribution server.

Within this example, an administrator of the topic tree within the distribution server desires to publish structured data to clients more efficiently as restructured data. To accomplish this, the administrator creates and sends a topic view creation request to the distribution server and, in response, the distribution server receives 520 the request.

The topic view creation request includes syntax to create a topic view. The topic view restructures information received at a topic in the topic tree for more efficient transmission at one or more reference topics in the topic tree. The syntax of the topic view creation request defines a set of selected topics indicated by a set of topic selectors. Each topic selector corresponds to topic path(s) of the selected topics. The syntax of the topic view creation request also defines a topic view mapping. The topic view mapping maps the selected topics to a set of reference topics according to the syntax of the topic view mapping. In some cases, the syntax of the topic view creation request also defines a set of options that impart preferences to how topic updates are restructured.

The distribution server creates 530 the set of reference topics in the topic tree according to the syntax of the topic view. Each of the reference topics has a reference path defined using the syntax of the topic view mapping, topic view selectors, and options in the topic view. Clients may subscribe to a reference topic by subscribing to its corresponding reference path.

When creating the reference topics in the topic tree, the distribution server tags all of its selected topics. Because the selected topics are tagged, the distribution server will evaluate the topic view when the selected topics receive a topic update from a publisher.

To provide additional context to the evaluation, recall that the publishers are continuously publishing structured data to the topic tree. After the topic view is created, when a publisher publishes new structured data (e.g., a topic update) to a selected topic, and the distribution server receives 540 the topic update.

The distribution server restructures 550 the topic update according to the topic view because the selected topic is tagged. The distribution server publishes 550 the restructured topic update to the reference topic according to the topic view. Any client subscribed to the reference topic will receive the restructured topic update.

V. Topic View Overview

Topic View Mappings

As described above, a topic view allows a client to view structured data as restructured data within a topic tree. In doing so the distribution server 110 employs the topic view module 270 to create and manage reference topics and reference paths. Reference paths can be derived from one or more topic paths, topic values, and/or constant values within the structured data. For clarity, originally structured data will be referred to as "source" topic paths, topic values, and constant values.

As additionally described above, a topic view includes a topic view mapping that maps source topic paths to reference topic paths. How a topic view mapping maps a source topic path to a reference topic path can be dictated by the domain specific language for the distribution server 110. For example, a topic view that maps a source topic path in one branch of the topic tree to a reference path in another branch of the topic tree is:

$$\text{map?}a/\text{to } b/\text{<path(1)>} \tag{1}$$

This specification of a topic view mappings all source topics under the source topic node a to matching topics under the reference node b. For example, a/x/y/z will be mapped to b/x/y/z, and so on. The directive path (1) indicates that one reads "all path elements from index 1 and beyond."

Furthermore, how a topic view mappings source topic paths to reference topic paths can depend on the data structures used within the topic tree. For example, in one implementation, the topic tree uses JSON topics and topic values withing the topic tree. When using JSON topics it is possible to extract a source topic value from the source topic and embed it in the path of the reference topic. It is also possible to map a subset of the source topic value to the reference value of the reference topic. The following example shows both of these features in use:

$$\text{map?accounts/to balances/<scalar(/account)> as <value(/balance)>} \tag{2}$$

In this case, a source topic with a source topic path of accounts/account1234 has a source topic value indicating the accounts remaining monetary value. The path and value may then be represented as follows:

$$\{ \tag{3}$$

"account" : "1234",

"balance" : { "amount" : 12.57, "currency" : "USD" }

}

Now, consider an example where the source topic value path and source topic value of equation (3) are mapped to reference paths and reference topic values using the topic view mapping map in equation (2). That is, the source topic value is mapped to a reference topic with a reference path of balances/1234 and the corresponding mapped reference value is as follows:

{ (4)

"amount" : 12.57,

"currency" : "USD"

}

Other examples of a topic view mapping source topics at source topic paths to reference topics at reference paths are also possible.

Topic View Expansion

The topic view module 270 also allows for topic view expansion. That is, rather than every source topic selected by a topic view mapping mapping to exactly one reference topic, the topic view mapping can map source topic that is a JSON array or JSON object to multiple, separate reference topics.

As an example, the syntax of a topic view including a topic view expansion is:

<expand(sourcePointer,pathPointer)> (5)

The sourcePointer parameter is a JSON pointer to an array or object, and may, or may not, be used depending on the implementation of the system. If the source pointer is not specified, then the system points to the root of the JSON value by default.

The optional pathPointer parameter is a JSON pointer indicating the reference topic path element, and may, or may not, be used depending on the implementation of the system. If the path pointer is not specified then the index (in the case of an array element), or the key (in the case of an object) is used instead.

Example Expansion—Single Array

To illustrate, using a single JSON array, assume a topic tree includes a JSON source topic called allCars containing an array including the plate number, make, and model of all the cars included in the array. As an example, allCars may be in the following format:

{ (6)

"cars": [

{ "reg":"HY58XPA", "type":"Ford", "model":"Sierra" },

{ "reg":"PY59GCA", "type":"Fiat", "model":"Panda"},

{ "reg":"VA63ABC", "type":"Ford", "model":"Ka"}

]

}

The topic view module 270 then receives and implements the following topic view mapping:

map allCars to cars/<expand(/cars,/reg)> (7)

Now consider an example where the topic view mapping in equation (7) is applied to the single array in equation (6). The topic view, when evaluated and applied, creates a set of reference topics. The reference topics have the following reference paths:

cars/*HY58XPA* cars/*PY59GCA* cars/*VA63ABC* (8)

The distribution server is also enabled with source pointers. The source pointer determines the reference value of the reference topic. For example, the reference value for reference topic at the reference path cars/HY58XPA is:

{ (9)

"reg":"HY58XPA",

"type":"Ford",

"model":"Sierra"

}

As described above, a topic view can include options. As an example, the second parameter in the topic view expansion of equation (7) in is an option:

map allCars to cars/<expand(/cars)> (10)

In this case, the reference topic path is taken from the index of the source topic array element, giving us these reference topics paths:

cars/0 cars/1 cars/2 (11)

In another example, the second, option parameter can allow for the expansion by the type of cars in the array in equation (6). To illustrate, the distribution may receive and evaluate the following topic view expansion:

map allCars to cars/<expand(/cars,/type)>/
    <scalar(/reg)> (12)

In this case, the mapping will result in reference topics named as follows:

cars/Ford/*HY58XPA* cars/Fiat/*PY59GCA* cars/Ford/*VA63ABC* (13)

Note how the scalar directive is relative to the root of the expanded element, not the source topic value.

Example Expansion—Objects

In another example, using a JSON object, assume a topic tree includes a JSON source topic called allCars containing an object including the owner of a car and the cars registration, make, and model. To illustrate, the topic tree may include a source topic people/jsmith. In this case, the source topic is an object with the source topic value:

{ (14)

"name" : "John Smith",

"car" {

"reg":"HY58XPA",

"type":"Ford"

"model":"Sierra"

}

}

The distribution server then receives, evaluates and implements the following topic view mapping:

map?people/to <scalar("/name")>/car/<expand(/car)> (15)

Now consider an example where the topic view mapping in equation (15) is applies to the source topic object in equation (14). In this case, evaluation of the topic view creates a reference topic with the corresponding values: The mapping of (15) applied to the object (14) creates a source topic with the corresponding reference paths and reference values:

| Path | Value | (16) |
|---|---|---|
| John Smith/car/reg | "HY58XPA" | |
| John Smith/car/type | "Ford" | |
| John Smith/car/model | "Sierra" | |

Example Expansion—Nested Expands

The distribution server can implement the expand directive more than one, or even many, times to unpack complex source topic values that contain nested arrays or objects. Each expand directive focusses the evaluation context to successively smaller parts of the source value. Accordingly, the JSON pointers in each directive (e.g., expansion) are evaluated relative to the value produced by the previous directive (e.g., expansion).

For example, a topic tree includes an array for all cars, but also includes the drivers of those cars. The array may have the following values:

```
{                                                            (17)
  "cars": [
    { "reg": "HY58PXA",
      "drivers": [{"name" : "Bill"}, {"name" : "Fred"}]
    },
    { "reg": "PY59GCA",
      "drivers": [{"name" : "Jane"}, {"name" : "Fred"}]
    },
    { "reg": "VA63ABC",
      "drivers": [{"name" : "Tom"}, {"name" : "John"}]
    }
  ]
}
```

The distribution server can expand both levels of the array hierarchy. For example, the system may receive and evaluate a topic value expansion:

map allCars to cars/<expand(/cars,/reg)>/drivers/
    <expand(/drivers,/name)>                      (18)

In this case, applying the topic view mapping in equation (18) to the source topic including the nested array in equation (17) generates the following reference topic values at reference paths:

| Path | Value | (19) |
|---|---|---|
| cars/HY58XPA/drivers/Bill | {"name" : "Bill"} | |
| cars/HY58XPA/drivers/Fred | {"name" : "Fred"} | |
| cars/PY59GCA/drivers/Jane | {"name" : "Jane"} | |
| cars/PY59GCA/drivers/Fred | {"name" : "Fred"} | |
| cars/VA63ABC/drivers/Tom | {"name" : "Tom"} | |
| cars/VA63ABC/drivers/John | {"name" : "John"} | |

Topic view expansion is a powerful feature allowing real-time manipulation of how a user chooses to view topic values. That is, it enables a client to take structured data that is hard to interpret within the topic tree and generate restructured data withing the topic tree that is more readily accessible.

Topic View Inserts

The topic view module 270 also allows for topic view insertion. That is, rather than only the source topics from selected topics in a topic being included in reference topics, other source topics can be inserted into a reference topic.

As an example, the syntax of a topic view including a topic view insert is:

map?Some_Source_Topics/ to Mapped_Topics/<path
    (1)> insert Some_Other_Topic at/Some_JSON_
    Pointer This topic view mappings all source topics beneath the source path Some_Source_Topics to similarly named reference topics under the reference path Mapped_Topics. The topic view also inserts the complete value of a source topic Some_Other_Topic into the current data with the key named Some_JSON_Pointer.

More broadly, the insert function adheres to the following form:

insert path_specification key source_key at insertion
    key default constant                                        (21)

The insert keyword introduces the clause and specifies the source path of the source topic from which data is to be obtained and merged with the current data value. The meaning of "current data value" can depend upon the other clauses in the specification and is defined in more detail below.

The path_specification defines the source path of the source topic to insert data from and it is similar to the current target path mapping in that it can contain constants, <path( )> directives, and <scalar( )> directives. The path directives operate on the source path of the selected topic and the scalar directives operate on the current input data as defined above.

To illustrate consider the following path_specification:

Topic/<path(1,2)>/<scalar(/foo)>                                                (22)

In this example, the path_specification would be specifying insertion from a source topic whose source topic path is Topic/ followed by elements 1 to 3 of the source topic path followed by / and the scalar value at the key /foo in the current input data.

The key source_key clause in equation (21) optionally specifies the key (a JSON pointer) of an item within the topic indicated by path_specification. If not specified, then the topic view module 270 assumes that the whole of the data value of the selected topic will be inserted.

The at insertion_key clause in equation (21) specifies a JSON pointer indicating the location of the insertion in the current data value.

Typically, this would be an object key which would indicate the key of the value in the data. If the data already had an item with the same key it would be overwritten, otherwise a new item would be added to the parent indicated by the specified key. The parent would have to exist otherwise the insertion would not occur and a warning would be logged.

This can also indicate an entry in an array. If an index key is provided, the existing entry at the specified index would be replaced. An index of one greater than the current number of entries could be used to append to an array, but it is much easier to use the special '-' character instead. For example, to append to the end of an array at MyArray you can use an insertion key of /MyArray/-. Therefore, if the key was specified as at /Address/Street, it would indicate that the value from the selected topic to insert from would be inserted within the current data value within an object called Address at a key called Street. If the object currently had a key called street, it would be overwritten; otherwise, it would be inserted into the object. If the resolved key indicates a scalar item, then no insertion will take place.

The default constant clause in equation (21) overrides a non-insert when a source topic to insert cannot be found, or the specified key within does not exist such that an insertion cannot occur. That is, if a default is specified and the source topic to insert from or the key within it are not found, the constant value will be inserted as a scalar value at the reference topic.

Current Data Values

The insert clause specifies the source path of the source topic from which structured data is to be obtained and merged with the current data value. The current data value is typically the value from the selected source topic; however, there are some situations where this is not the case. In a first example, if the topic view mapping includes one or more expand directives, the current data value will be the expanded data value. In a second example, if the insert is preceded by an as<value(key)> directive, the current data will be the data indicated by the key. In a third example, if the insert was preceded by another insert clause, the current data will be the output from that clause.

Example Inserts

In an example, consider the following topic mapping include an insert directive:

map Topic1 to Topic2 insert AnotherTopic at /other (23)

Here, source Topic1 is mapped to reference Topic2 and the data within source AnotherTopic is inserted into it at the key named other. If AnotherTopic does not exist (or is not JSON or scalar), Topic2 will be created with the same value as Topic1 but with nothing inserted. Further, in this case, the value of Topic1 is an object, because if it were an array, then no insertion will occur.

In another example, consider the following topic mapping including an insert directive:

map Topic1 to Topic2 insert AnotherTopic at /other
default "unknown" (24)

This example is largely similar to the previous example. However, in this example, if source topic AnotherTopic does not exist, then reference Topic2 will be created with key other inserted with a scalar value of unknown.

In another example, consider the following topic mapping including an insert directive:

map?Topics/ to Mapped/<path(1)> insert Another-
Topic at /other (25)

This example is largely similar to the previous example. However, in this case, case all of the topics under the source path Topics will be selected and mapped to topics with the same name under the reference path Mapped. Every selected topic will have the value of AnotherTopic inserted into it (assuming they are JSON objects). If AnotherTopic does not exist, no insertions would take place.

In another example, consider the following topic mapping including an insert directive:

map?Topics/ to Mapped/<path(1)> insert Others/
<path(1)> at /other (26)

This example is more complex than those demonstrated previously. In this case, each selected topic has an insertion from a source topic with the same topic under the source path Others. For example, source Topics/A/B would generate a reference topic at reference path Mapped/A/B which has the value of Others/A/B inserted at the key other.

In another example, consider the following topic mapping including an insert directive:

map?Topics/ to Mapped/<path(1)> insert Others/
<scalar(/foo)> at /other (27)

This example is largely similar to the previous example. However, in this case, the source path of the insertion topic will be derived from a topic value within the selected source topic. Thus, if source topic Topics/A/B has a value of "bar" at key "foo" then topic selected to insert from would be Others/bar.

In another example, consider the following topic mapping including an insert directive:

map?Topics/ to Mapped/<path(1)> insert Others/
<path(1)> key /foo at /other (28)

All previous examples have shown the insertion of the whole value of another topic. Here the key keyword is used to select a specific item foo within the insertion topic value. If the insertion topic does not have the value with key foo then a reference topic will be created but no insertion will occur as we have specified no default.

When expand directives are used, the insert will occur for every output from the expansion. Within this context, consider the following topic mapping including an insert directive with an expand directive:

map Topic1 to Expanded/<expand( )> insert
AnotherTopic at /other (29)

If we assume that the content of source topic Topic1 is an array of objects, then each array element will be expanded to produce a new topic at reference path Expanded/0, expanded/1 and so on, and each resulting reference topic will have the reference value from AnotherTopic inserted at the key /other.

Furthermore, insert clauses can be chained. Within this context, consider the following topic mapping including an insert directive with an expand directive:

map Topic1 to Topic2 insert AnotherTopic at /other
insert YetAnotherTopic at /yetAnother (30)

In the above example, values from two different topics are inserted into the data to produce the reference topic.

Finally, the insert clause can be used along with as <value( )> clauses. Within this context, consider the following topic mapping including an insert directive with an expand directive:

map Topic1 to Topic2 insert AnotherTopic at /foo/
bar as <value(/foo)> (31)

Here, the data from AnotherTopic is inserted at the key foo/bar, then the full value of foo is projected.

Adding Topics to a Topic Tree

In some examples, adding a topic to a topic tree can trigger an evaluation of a topic view and create new reference topics and topic paths. For example, consider a topic view including a topic selector for A* that publishes structured data as restructured data when a publisher updates the topic values at A. If the publisher creates a sub-topic of A, then the topic view mapping may create new reference paths depending on how the source topic paths are mapped to reference topic paths. In this case, the distribution server will reevaluate the topic view and create any new reference paths and reference topics based on the topic view mapping. In some examples this can include not adding new reference topics, while in others it may include adding new reference topics.

Deleting Topics and Topic Views

Deleting a selected topic from a topic tree also triggers an evaluation of the topic view to remove any pertinent reference topics and reference topic paths. In this case, the distribution server determines whether the removed topic is tagged as being a selected topic in any of the topic views. If so, the distribution server, performs an evaluation to remove any necessary reference paths. In this evaluation, the distribution server identifies any reference paths for removal by determining what (if any) reference topic path(s) would be created for the deleted topic based on the topic view mapping and removing those reference topic paths.

Deleting a topic view is similar to the above example. That is, the topic view is revaluated to determine what reference paths would be created by the topic view mapping and removing those reference topic paths.

VI. Additional Considerations

The foregoing description has been presented for the purpose of illustration; it is not intended to be exhaustive or to limit the description to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a non-transitory computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the embodiments be limited not by this detailed description, but rather by any claims that issue on an application based herein. Accordingly, the disclosure of the embodiments is intended to be illustrative, but not limiting, of the scope of the invention, which is set forth in the following claims.

What is claimed is:

1. A method for restructuring content published to a topic tree by a plurality of publishers, the topic tree comprising a plurality of topics, with each topic of the plurality of topics corresponding to a respective topic path of a plurality of topic paths to which clients can subscribe, the method comprising:
receiving a topic view creation request from a client, the topic view creation request specifying a requested mapping of a set of selected topics in the topic tree to a set of reference topics in the topic tree according to a syntax of the topic view creation request;
responsive to receiving the topic view creation request, creating a set of reference topic paths in the topic tree based on the syntax of the topic view creation request, wherein each reference topic path in the set of reference topic paths comprises a reference topic of the set of reference topics corresponding to a selected topic of the set of selected topics as specified in the requested mapping;
receiving, from a publisher of the plurality of publishers, a topic update defining topic values for at least one of the set of selected topics;
responsive to receiving the topic update, restructuring the topic values by mapping them from the set of selected topics to the set of reference topics; and
publishing the restructured topic values from the topic update to a client subscribed to a reference topic of the set of reference topics.

2. The method of claim 1, wherein the syntax of the topic view creation request defines a set of topic selectors for the set of selected topics, the set of topic selectors describing a set of selected topic paths of the plurality of topic paths corresponding to their respective selected topics.

3. The method of claim 1, wherein the syntax of the topic view creation request defines a topic view mapping that maps a set of selected topic paths corresponding to their respective selected topics to a set of reference topic paths corresponding to their respective reference topics.

4. The method of claim 1, wherein the syntax of the topic view creation request defines a set of options that dictate how restructured topic values are published to the client.

5. The method of claim 1, wherein the syntax of the topic view creation request defines an expansion directive, the expansion directive mapping a number of elements in a topic value of a selected topic of the set of selected topics to a same number of reference topics in the set of reference topics.

6. The method of claim 1, wherein the syntax of the topic view creation request defines an insert directive, the insert directive mapping a topic value not included in the set of selected topics to a respective reference topic in the set of reference topics.

7. The method of claim 1, further comprising:
receiving a plurality of topic view creation requests, each topic view of the plurality specifying a mapping of a set of selected topics or a plurality of sets of selected topics in the topic tree to a set of reference topics of a plurality of sets of reference topics in the topic tree according to a syntax of a plurality of syntaxes; and
creating the plurality of sets of reference topics in the topic tree based on the plurality of syntaxes in the plurality of topic view creation requests, each reference topic created at a reference topic path in the topic tree.

8. A non-transitory computer-readable storage medium storing computer instructions for restructuring content published to a topic tree by a plurality of publishers, the topic tree comprising a plurality of topics, with each topic of the plurality of topics corresponding to a respective topic path of a plurality of topic paths to which clients can subscribe, and the computer instructions, when executed by one or more processors, causing the processors to:
receive a topic view creation request from a client, the topic view creation request specifying a requested mapping of a set of selected topics in the topic tree to a set of reference topics in the topic tree according to a syntax of the topic view creation request;
responsive to receiving the topic view creation request, create a set of reference topic paths in the topic tree based on the syntax of the topic view creation request, wherein each reference topic path in the set of reference topic paths comprises a reference topic of the set of reference topics corresponding to a selected topic of the set of selected topics as specified in the requested mapping;
receive, from a publisher of the plurality of publishers, a topic update defining topic values for at least one of the set of selected topics;
responsive to receiving the topic update, restructure the topic values by mapping them from the set of selected topics to the set of reference topics; and
publish the restructured topic values from the topic update to a client subscribed to a reference topic of the set of reference topics.

9. The non-transitory computer-readable storage medium of claim 8,
wherein the syntax of the topic view creation request defines a set of topic selectors for the set of selected topics, the set of topic selectors describing a set of selected topic paths of the plurality of topic paths corresponding to their respective selected topics.

10. The non-transitory computer-readable storage medium of claim 8, wherein the syntax of the topic view creation request defines a topic view mapping that maps a set of selected topic paths corresponding to their respective selected topics to a set of reference topic paths corresponding to their respective reference topics.

11. The non-transitory computer-readable storage medium of claim 8, wherein the syntax of the topic view creation request defines a set of options that dictate how restructured topic values are published to the client.

12. The non-transitory computer-readable storage medium of claim 8, wherein the syntax of the topic view creation request defines an expansion directive, the expansion directive, when executed by the one or more processors, mapping a number of elements in a topic value of a selected topic of the set of selected topics to a same number of reference topics in the set of reference topics.

13. The non-transitory computer-readable storage medium of claim 8, wherein the syntax of the topic view creation request defines an insert directive, the insert directive, when executed by the one or more processors, mapping a topic value not included in the set of selected topics to a respective reference topic in the set of reference topics.

14. The non-transitory computer-readable storage medium of claim 8, wherein the computer instructions, when executed, further cause the one or more processors to:
receive a plurality of topic view creation requests, each topic view of the plurality specifying a mapping of a set of selected topics or a plurality of sets of selected topics in the topic tree to a set of reference topics of a plurality of sets of reference topics in the topic tree according to a syntax of a plurality of syntaxes; and
create the plurality of sets of reference topics in the topic tree based on the plurality of syntaxes in the plurality of topic view creation requests, each reference topic created at a reference topic path in the topic tree.

15. A system for restructuring content published to a topic tree by a plurality of publishers, the topic tree comprising a plurality of topics, with each topic of the plurality of topics corresponding to a respective topic path of a plurality of topic paths to which clients can subscribe, the system comprising:
one or more computer processors; and
a non-transitory computer-readable storage medium storing computer program instructions, the computer program instructions executable by the one or more computer processors to perform operations comprising:
receiving a topic view creation request from a client, the topic view creation request specifying a requested mapping of a set of selected topics in the topic tree to a set of reference topics in the topic tree according to a syntax of the topic view creation request;
responsive to receiving the topic view creation request, creating a set of reference topic paths in the topic tree based on the syntax of the topic view creation request, wherein each reference topic path in the set of reference topic paths comprises a reference topic of the set of reference topics corresponding to a selected topic of the set of selected topics as specified in the requested mapping;
receiving, from a publisher of the plurality of publishers, a topic update defining topic values for at least one of the set of selected topics;
responsive to receiving the topic update, restructuring the topic values by mapping them from the set of selected topics to the set of reference topics; and
publishing the restructured topic values from the topic update to a client subscribed to a reference topic of the set of reference topics.

16. The system of claim 15, wherein the syntax of the topic view creation request defines a set of topic selectors for the set of selected topics, the set of topic selectors describing a set of selected topic paths of the plurality of topic paths corresponding to their respective selected topics.

17. The system of claim 15, wherein the syntax of the topic view creation request defines a topic view mapping that maps a set of selected topic paths corresponding to their respective selected topics to a set of reference topic paths corresponding to their respective reference topics.

18. The system of claim 15, wherein the syntax of the topic view creation request defines a set of options that dictate how restructuring topic values publishes the restructured topic values to the client.

19. The system of claim 15, wherein the syntax of the topic view creation request defines an expansion directive, the expansion directive mapping a number of elements in a topic value of a selected topic of the set of selected topics to a same t number of reference topics in the set of reference topics.

20. The system of claim 15, wherein the syntax of the topic view creation request defines an insert directive, the insert directive mapping a topic value not included in the set of selected topics to a respective reference topic in the set of reference topics.

21. The system of claim 15, wherein the computer instructions, when executed, further cause the one or more processors to perform operations comprising:
  receiving a plurality of topic view creation requests, each topic view of the plurality specifying a mapping of a set of selected topics or a plurality of sets of selected topics in the topic tree to a set of reference topics of a plurality of sets of reference topics in the topic tree according to a syntax of a plurality of syntaxes; and
  creating the plurality of sets of reference topics in the topic tree based on the plurality of syntaxes in the plurality of topic view creation requests, each reference topic created at a reference topic path in the topic tree.

\* \* \* \* \*